(12) United States Patent
Nilsson et al.

(10) Patent No.: US 10,317,902 B2
(45) Date of Patent: Jun. 11, 2019

(54) METHOD AND SYSTEM FOR EVALUATING INTER-VEHICLE TRAFFIC GAPS AND TIME INSTANCES TO PERFORM A LANE CHANGE MANEUVER

(71) Applicant: VOLVO CAR CORPORATION, Gothenburg (SE)

(72) Inventors: Julia Nilsson, Gothenburg (SE); Mattias Erik Brannstrom, Gothenburg (SE)

(73) Assignee: VOLVO CAR CORPORATION, Gothenburg (SE)

(*) Notice: Subject to any disclaimer, the term of this patent is extended or adjusted under 35 U.S.C. 154(b) by 178 days.

(21) Appl. No.: 15/435,815

(22) Filed: Feb. 17, 2017

(65) Prior Publication Data

US 2017/0242435 A1 Aug. 24, 2017

(30) Foreign Application Priority Data

Feb. 22, 2016 (EP) .................................... 16156686

(51) Int. Cl.
*G05D 1/00* (2006.01)
*B60W 30/16* (2012.01)
(Continued)

(52) U.S. Cl.
CPC ........... *G05D 1/0088* (2013.01); *B60W 30/16* (2013.01); *G05D 1/0214* (2013.01); *G08G 1/167* (2013.01);
(Continued)

(58) Field of Classification Search
CPC ... G05D 1/0088; G05D 1/0214; B60W 30/16; B60W 2550/14; B60W 2550/308; G08G 1/167
See application file for complete search history.

(56) References Cited

U.S. PATENT DOCUMENTS

| 7,418,372 B2 * | 8/2008 | Nishira | B60K 31/047 700/44 |
| 2004/0085197 A1 * | 5/2004 | Watanabe | B60T 7/22 340/435 |

(Continued)

FOREIGN PATENT DOCUMENTS

| DE | 102011106746 A1 | 1/2013 |
| DE | 102014200896 A1 | 7/2015 |
| EP | 2711908 A1 | 3/2014 |

OTHER PUBLICATIONS

Extended European Search Report dated Sep. 19, 2016, Application No. 16156686.4-1803, Applicant Volvo Car Corporation, 9 Pages.

*Primary Examiner* — Thomas G Black
*Assistant Examiner* — Sze-Hon Kong
(74) *Attorney, Agent, or Firm* — Brooks Kushman P.C.

(57) ABSTRACT

A method and system for evaluating inter-vehicle traffic gaps and time instances to perform a lane change maneuver is described. The method includes determining a set of trajectories which respectively constitutes an approximation of the feasible motion of the ego vehicle, evaluating the set of trajectories on the available inter-vehicle traffic gaps and time instances to perform the lane change maneuver over a prediction horizon to select a subset of feasible inter-vehicle traffic gaps and time instances to perform the lane change maneuver and to establish a corresponding set of lane change trajectories, evaluating the set of lane change trajectories on the subset of feasible inter-vehicle traffic gaps and time instances from a safety critical perspective, and selecting a preferred lane change trajectory, with corresponding inter-vehicle traffic gap and time instance, to perform the lane change maneuver.

20 Claims, 1 Drawing Sheet

(51) Int. Cl.
*G05D 1/02* (2006.01)
*G08G 1/16* (2006.01)

(52) U.S. Cl.
CPC ... *B60W 2550/14* (2013.01); *B60W 2550/308* (2013.01)

(56) References Cited

U.S. PATENT DOCUMENTS

| | | | | |
|---|---|---|---|---|
| 2005/0015203 A1* | 1/2005 | Nishira | ............... | B60W 50/16 701/301 |
| 2013/0184926 A1* | 7/2013 | Spero | ............... | B62D 1/28 701/26 |
| 2013/0325306 A1* | 12/2013 | Caveney | ............... | B60W 30/0953 701/117 |
| 2014/0074356 A1* | 3/2014 | Bone | ............... | G08G 1/167 701/41 |
| 2014/0371981 A1* | 12/2014 | Nordbruch | ............... | G07C 5/0841 701/36 |
| 2015/0213718 A1* | 7/2015 | Ono | ............... | B60Q 1/00 340/435 |
| 2016/0129907 A1* | 5/2016 | Kim | ............... | B60W 30/09 701/26 |
| 2016/0185388 A1* | 6/2016 | Sim | ............... | B62D 15/0255 701/41 |
| 2017/0080940 A1* | 3/2017 | Ito | ............... | B60W 10/184 |
| 2017/0160745 A1* | 6/2017 | Lauffer | ............... | G01S 13/931 |
| 2017/0183013 A1* | 6/2017 | Matsumoto | ............... | B60W 30/18163 |
| 2017/0190331 A1* | 7/2017 | Gupta | ............... | B60Q 1/346 |
| 2017/0232966 A1* | 8/2017 | Ishioka | ............... | B60W 10/04 701/96 |
| 2017/0235310 A1* | 8/2017 | Miyake | ............... | F01N 9/002 701/25 |
| 2017/0240182 A1* | 8/2017 | Hatano | ............... | B60W 10/04 |
| 2018/0194354 A1* | 7/2018 | Takeda | ............... | B60K 31/00 |
| 2018/0201272 A1* | 7/2018 | Takeda | ............... | B60W 30/10 |
| 2018/0238696 A1* | 8/2018 | Takeda | ............... | G01C 21/26 |
| 2018/0251155 A1* | 9/2018 | Chan | ............... | B60R 1/00 |
| 2018/0253103 A1* | 9/2018 | Winkler | ............... | G05D 1/0088 |
| 2019/0031202 A1* | 1/2019 | Takeda | ............... | B60W 10/18 |
| 2019/0054928 A1* | 2/2019 | Hatano | ............... | B60W 30/14 |

* cited by examiner

METHOD AND SYSTEM FOR EVALUATING INTER-VEHICLE TRAFFIC GAPS AND TIME INSTANCES TO PERFORM A LANE CHANGE MANEUVER

CROSS-REFERENCE TO RELATED APPLICATIONS

This application claims foreign priority benefits under 35 U.S.C. § 119(a)-(d) to European patent application number EP 16156686.4, filed Feb. 22, 2016, which is incorporated by reference in its entirety.

TECHNICAL FIELD

The present disclosure relates to a method and a system for evaluating inter-vehicle traffic gaps and time instances to perform a lane change maneuver. The disclosure further relates to an automated lane change system, an advanced driver assistance system and a vehicle.

BACKGROUND

When a partially automated, semi-automated or fully automated vehicle drives on a road comprising more than one lane going in the same direction, a lane change is sometimes desirable, e.g., when there is a slow-driving preceding vehicle ahead or when there is a faster vehicle approaching from behind. A lane change may also be desirable when the own lane ends. In order to perform the lane change maneuver, an inter-vehicle traffic gap may have to be selected in a target lane as well as a time instance to perform the lane change maneuver.

Advanced driver assistance systems, abbreviated as ADAS, e.g., adaptive cruise control, abbreviated as ACC, lane keeping aid, abbreviated as LKA, and traffic jam assist, abbreviated as TJA, are becoming more and more common as the development towards autonomous or automated vehicles progress. To further increase the autonomous capability of ADAS and eventually progress to fully automated or autonomous driving on e.g., highways, the ability of an ego (i.e., host) vehicle to perform lane change maneuvers is desirable.

There are various research projects ongoing regarding trajectory planning for lane change maneuvers. Many of the proposed approaches consider the lane change trajectory planning problem mainly as a lateral planning problem. It is often assumed that given a sufficiently large inter-vehicle traffic gap, the ego vehicle can perform a lateral movement into the target lane.

However, it may also be desirable to consider the longitudinal planning. There is thus a desire for an improved method and system for evaluating inter-vehicle traffic gaps and time instances to perform a lane change maneuver.

SUMMARY

The object of the present disclosure is to overcome or ameliorate at least one of the disadvantages of the prior art, or to provide a useful alternative.

The object above may be achieved by the subject-matter disclosed herein. Embodiments are set forth in the appended dependent claims, in the following description and in the drawings.

Thus, according to the disclosure there is provided a method for evaluating inter-vehicle traffic gaps and time instances to perform a lane change maneuver. The method is performed by a system on-board an ego (i.e., host) vehicle. The ego vehicle travels in a current lane of a road, which also comprises a target lane adjacent to the current lane. The lane change maneuver comprises the ego vehicle changing from the current lane to an inter-vehicle traffic gap in the target lane. The method comprises:

a) determining a set of trajectories which respectively constitutes an approximation of the feasible motion of the ego vehicle, b) evaluating the set of trajectories on available inter-vehicle traffic gaps and time instances to perform the lane change maneuver over a prediction horizon to select a subset of feasible inter-vehicle traffic gaps and time instances to perform the lane change maneuver and to establish a corresponding set of lane change trajectories, c) evaluating the set of lane change trajectories on the set of feasible inter-vehicle traffic gaps and time instances from a safety critical perspective, and d) selecting a preferred lane change trajectory, with corresponding inter-vehicle traffic gap and time instance, to perform the lane change maneuver.

The road comprises at least the current lane and the target lane. There may in addition be one or more additional lanes on the road in the same direction and/or in the opposite direction. The current lane is the lane of the ego vehicle before the lane change maneuver is started. The target lane is the lane of the ego vehicle after the lane change maneuver is finished.

Sometimes a lane change of the ego vehicle from the current lane into the target lane may be desirable, e.g., when there is a slow-driving preceding vehicle in the current lane or when there is a faster vehicle approaching from behind. A lane change may also be desirable when the current lane ends.

The method for evaluating inter-vehicle traffic gaps and time instances to perform a lane change maneuver as disclosed herein describes a method suitable for automated gap selection. The method may be performed by a system for evaluating inter-vehicle traffic gaps and time instances to perform a lane change maneuver, e.g., the system as disclosed herein. The system may form part of an automated lane change system, which may in turn form part of an advanced driver assistance system. The system described herein may be comprised in the ego vehicle. Alternatively, or as a complement, the system may be a separate mobile device, which can be placed and used in the ego vehicle.

The method as disclosed herein may be performed in a partially automated, semi-automated or fully automated vehicle. In a partially automated vehicle or a semi-automated vehicle, a driver of the vehicle performs some of the driving functions, while the vehicle autonomously performs other functions. If the vehicle is fully automated, the vehicle autonomously performs the driving functions, at least for a temporary period of time. A vehicle may be arranged to be able to change between driving manually, partially automated, semi-automated and/or fully automated.

The term inter-vehicle traffic gap relates to a longitudinal distance, e.g., expressed in meters between two vehicles. The longitudinal distance is the distance as seen in a running direction of the road and/or along lane markings thereof. If a surrounding vehicle travels in another lane than the ego vehicle, there is also a lateral distance to the surrounding vehicle. If a surrounding vehicle travels in the same lane as the ego vehicle, there is a longitudinal distance to the other vehicle, but only a small lateral distance or even no lateral distance. The longitudinal position of a vehicle relates to the position as seen in the running direction of the road. There is also a lateral position component. The lateral direction is perpendicular to the longitudinal direction.

In step a, a set of trajectories, which respectively constitutes an approximation of feasible motion of the ego vehicle, are determined.

The feasible motion of the ego vehicle may be set by physical and/or design constraints of the ego vehicle. The constraints may come from the ego vehicle itself, e.g., its technical performance, but may also be set by external factors, such as road conditions or weather conditions, e.g., a slippery road or a heavy rainfall.

In step a, a number of acceleration profiles may be assumed, e.g., a number of constant acceleration profiles. The acceleration profiles may be selected to be within a range going from a minimum acceleration of the ego vehicle to a maximum acceleration of the ego vehicle. The minimum acceleration is the same as the maximum deceleration. As mentioned above, the minimum and the maximum acceleration may be set by the physical and/or design constraints of the ego vehicle.

The prediction horizon is a time period in which the lane change maneuver is supposed to occur. The prediction horizon may be in the range of from 1 to 60 seconds, preferably in the range of from 2 to 30 seconds, more preferably in the range of from 5 to 15 seconds, such as for example 10 seconds.

In step b, the set of trajectories determined in step a are evaluated on the available inter-vehicle traffic gaps and time instances to perform the lane change maneuver over the prediction horizon. One, two, three or more inter-vehicle traffic gaps may be considered in the evaluation. The set of available inter-vehicle traffic gaps may comprise the inter-vehicle traffic gaps in the target lane being detected within a sensor range of a sensing system, e.g., comprising camera and/or radar monitoring. The sensor range may vary dependent on kinds of sensors and number of sensors, but may be in the range of from 50 to 200 meters ahead of and behind the ego vehicle, e.g., 100 meters ahead and 100 meters behind the ego vehicle. Being within the sensor range means that the sensor can detect objects being located in a region extending from the ego vehicle, which carries the sensing system, to the sensor range. In the example above, objects could be detected within +/−0 to 100 meters from the ego vehicle.

The sensing system of the ego vehicle may be utilized for determining relative positions and/or velocities of at least one surrounding object, preferably for all, or substantially all, surrounding objects, to thereby determine existing inter-vehicle traffic gaps. Additionally, or alternatively, the surrounding objects may transmit information about their positions and/or velocities and the ego vehicle may receive this information directly or via an information database. In that case, the longitudinal extension of the portion of the target lane being searched for available inter-vehicle traffic gaps and time instances to perform the lane change maneuver over the prediction horizon may be set to a preselectable value or may be selected dependent on traffic situation and traffic conditions.

The corresponding space, which the ego vehicle should traverse in order to perform the lane-change maneuver, can be divided into three regions: a safe region in the current lane, a lane-change region and an inter-vehicle traffic gap region.

The safe region in the current lane is defined by the objects, e.g., vehicles, pedestrians, and road barriers, which the ego vehicle should account for—i.e., take into account—when approaching the lane-change region.

The lane-change region is defined by the environment where the ego vehicle does not have right-of-way i.e., the objects the ego vehicle takes into account when performing the lateral motion of the lane change maneuver.

The inter-vehicle traffic gap region is defined by the objects which the ego vehicle should account for after leaving the lane-change region and moving into the target lane. The inter-vehicle traffic gap region is located in the target lane.

The minimum time is the minimum time it takes for the ego vehicle to laterally traverse the lane-change region, i.e., the minimum time it takes for the ego vehicle to perform the lateral movement from its current lane into the target lane, e.g., between 1 and 5 seconds, such as 3 seconds.

As a result of the evaluation in step b, a subset of feasible inter-vehicle traffic gaps and time instances to perform the lane change maneuver is selected and a corresponding set of lane change trajectories is established. A certain trajectory is then associated with a certain inter-vehicle traffic gap and a time instance.

An inter-vehicle traffic gap being feasible means that the inter-vehicle traffic gap is reachable at a certain time instance using one or more of the trajectories in step a. Step b comprises determining if a trajectory determined in step a allows the ego vehicle to enter a corresponding lane change region of a certain inter-vehicle traffic gap and remain in the lane-change region for a minimum time, and thereafter safely be positioned in a corresponding inter-vehicle traffic gap region in the target lane over the prediction horizon.

To avoid collision conflicts with objects in the surrounding traffic environment, the method may comprise that the ego vehicle should maintain a minimum safe distance $d_s$ to the surrounding objects. The minimum safe distance $d_s$ may described by $$d_s(v_i) = \max(\in, \tau v_i) \qquad (1)$$

where $v_i$ is the velocity of a surrounding preceding object denoted by i and $\in$ and $\tau$, respectively, denote the minimum distance and time gap which the ego vehicle should maintain to the surrounding object.

In step c, the set of lane change trajectories from step b is evaluated on the set of feasible inter-vehicle traffic gaps and time instances from a safety critical perspective.

Step c may comprise taking a safety critical event into account. A safety critical event is an event, which may threaten the ego vehicle if occurring, such that the ego vehicle may risk becoming involved in an accident.

The safety critical event may comprise a relevant preceding vehicle, e.g., a vehicle in front of the ego vehicle, making a substantial braking maneuver. A substantial braking maneuver is characterized in that the braking is performed with the full, or substantially the full capacity of the vehicle. It may then be assumed that the relevant preceding vehicle brakes like an average vehicle.

Alternatively, or additionally, the safety critical event may comprise that a surrounding vehicle performs a sudden unexpected lane change maneuver ahead of the ego vehicle in its current lane.

When planning a lane change maneuver, a safety critical event which may be taken into account is the possibility of any relevant preceding vehicle unexpectedly performing a substantial brake maneuver, as mentioned above. To account for this possibility, the ego vehicle should not perform a lane change maneuver for which it does not have the ability to avoid a collision if such an event occurs. Thus, when selecting the inter-vehicle traffic gap and time instance for when to initiate the maneuver, in addition to a certain acceleration profile allowing the ego vehicle to enter the lane-change region and remain in that region for the minimum time and thereafter safely be positioned in the inter-vehicle traffic gap region over the prediction horizon, it should also be possible for the ego vehicle to apply a deceleration profile which allows it to not be closer than the minimum safe distance to the surrounding vehicle at the next time instance. As such, when determining the most appropriate inter-vehicle traffic gap and time instance for performing the lane change maneuver, the possibility of a relevant preceding vehicle performing a substantial brake maneuver is accounted for, and thereby it should be possible for the ego vehicle to avoid a collision in such a situation.

Step d comprises selecting a preferred lane change trajectory with corresponding inter-vehicle traffic gap and time instance, considering the safety critical perspective of step c, to perform the lane change maneuver.

The velocity of the ego vehicle may be constrained in the lane-change region.

To further account for the possibility of a relevant preceding vehicle unexpectedly performing a substantial brake maneuver, whilst in the lane-change region, the velocity of the ego vehicle $v_x(v_i)$ in the longitudinal direction x may be constrained to $$v_x(v_i) = \min(v_{x_{max}}, \sqrt{v_i^2 - 2a_{x_{min}} d_b}) \quad (2)$$

where $v_i$ is the velocity of a surrounding preceding object denoted by i, $v_{x_{max}}$ denotes the maximum allowed velocity of the ego vehicle E, $a_{x_{min}}$ denotes the minimum acceleration of the ego vehicle E, i.e., the maximum deceleration, and $d_b$ denotes a possible braking distance defined as e.g., $$d_b(v_i) = \tau v_i - \in \quad (3).$$

The selection in step d may be performed by selecting a trajectory, for which one or more required control signals for the ego vehicle, e.g., longitudinal acceleration/deceleration, has the smallest magnitude considering step b and the safety critical perspective of step c.

As an alternative, or a complement, the selection in step d may be performed by selecting a preferred inter-vehicle traffic gap as the inter-vehicle traffic gap for which the corresponding lane change region comes first in time considering step b and the safety critical perspective of step c.

As yet an alternative, the inter-vehicle traffic gap for which the corresponding lane change region is the largest could be selected considering step b and the safety critical perspective of step c.

According to the disclosure, there is also provided a system for evaluating inter-vehicle traffic gaps and time instances to perform a lane change maneuver. The lane change maneuver is performed when the ego vehicle travels in a current lane of a road, which also comprises a target lane adjacent to the current lane. The lane change maneuver comprises the ego vehicle changing from the current lane to an inter-vehicle traffic gap in the target lane.

The system comprises:
a unit for determining a set of trajectories which respectively constitutes an approximation of feasible motion of the ego vehicle,
a unit for evaluating the set of trajectories on available inter-vehicle traffic gaps and time instances to perform the lane change maneuver over a prediction horizon to select a subset of feasible inter-vehicle traffic gaps and time instances to perform the lane change maneuver and to establish a corresponding set of lane change trajectories,
a unit for evaluating the set of lane change trajectories on the set of feasible inter-vehicle traffic gaps and time instances from a safety critical perspective, and
a unit for selecting a preferred lane change trajectory, with corresponding inter-vehicle traffic gap and time instance, to perform the lane change maneuver.

The units of the system thus correspond to the steps of the method as disclosed herein, such that the system is suitable for carrying out the method.

The system may further comprise a sensing system, e.g., comprising camera and/or radar monitoring, for determining relative positions and/or velocities of at least one of the surrounding objects, preferably for all or substantially all surrounding objects.

According to the disclosure, there may further be provided an automated lane change system comprising the system for evaluating inter-vehicle traffic gaps and time instances to perform a lane change maneuver as disclosed herein.

In addition, there may be an advanced driver assistance system comprising the automated lane change system.

Moreover, there may be provided a vehicle comprising the system for evaluating inter-vehicle traffic gaps and time instances to perform a lane change maneuver as described herein. Additionally, or alternatively, the vehicle may comprise the lane change system and/or the advanced driver assistance system.

BRIEF DESCRIPTION OF THE DRAWINGS

The present disclosure will hereinafter be further explained by means of non-limiting examples with reference to the attached drawings.

It should be noted that the appended drawings are not necessarily drawn to scale and that the dimensions of some features of the present disclosure may have been exaggerated for the sake of clarity.

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

The disclosure will, in the following, be exemplified by embodiments. It should however be realized that the embodiments are included in order to explain principles of the disclosure and not to limit the scope of the disclosure, defined by the appended claims. Details from two or more of the embodiments may be combined with each other.

Figure 1:
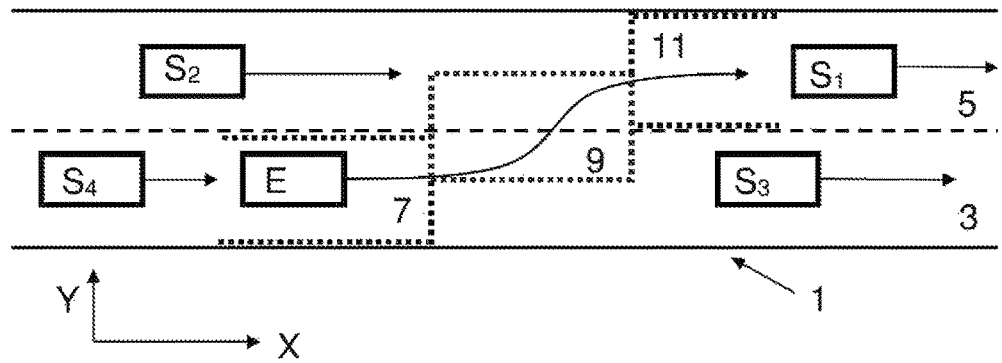
FIG. 1 illustrates a traffic situation, wherein an ego (i.e., host) vehicle travels on a road.

FIG. 1 schematically illustrates a traffic situation, wherein an ego (i.e., host) vehicle E travels on a road 1 having at least two adjacent lanes 3, 5 for traffic in the same direction. There may in addition be one or more additional lanes on the road 1 in the same direction and/or in the other direction. The ego vehicle E travels in a current lane 3. Adjacent to the current lane 3 there is another lane forming a target lane 5 for a lane change maneuver of the ego vehicle E. In the illustrated traffic situation there are four surrounding vehicles, a first $S_1$, a second $S_2$, a third $S_3$ and a fourth $S_4$ surrounding vehicle. The first surrounding vehicle $S_1$ moves in front of the second surrounding vehicle $S_2$ in the target lane 5. There is thus illustrated an inter-vehicle traffic gap between the first surrounding vehicle $S_1$ and the second surrounding vehicle $S_2$ in the target lane 5. The third surrounding vehicle $S_3$ moves in front of the fourth surrounding vehicle $S_4$ in the current lane 3.

Sometimes a lane change of the ego vehicle E from its current lane 3 into the target lane 5 is desirable, e.g., when there is a slow-driving preceding vehicle in the current lane 3 or when there is a faster vehicle approaching from behind. A lane change may also be desirable when the lane current lane 3 ends, e.g., due to road work.

The term inter-vehicle traffic gap relates to a longitudinal distance, e.g., expressed in meters between two vehicles. The longitudinal distance is the distance as seen in a running direction X of the road 1 and/or along lane markings thereof. If a surrounding vehicle $S_1$, $S_2$ travels in another lane 5 than the ego vehicle E, there is also a lateral distance to the surrounding vehicle $S_1$, $S_2$. If a surrounding vehicle $S_3$, $S_4$ travels in the same lane 3 as the ego vehicle E, there is a longitudinal distance to the other vehicle $S_3$, $S_4$, but only a small lateral distance or even no lateral distance. The longitudinal position of a vehicle relates to the position as seen in the running direction X of the road. There is also a lateral position component. The lateral direction Y is perpendicular to the longitudinal direction X.

For a certain traffic situation where the ego vehicle E does not have right-of way, like the traffic situation illustrated in FIG. 1, the corresponding space which the ego vehicle E should traverse can be divided into three regions: a safe region in the current lane 7, a lane-change region 9 and an inter-vehicle traffic gap region 11.

The safe region 7 in the current lane 3 is defined by the objects, e.g., vehicles, pedestrians, and road barriers which the ego vehicle E should account for when approaching the lane-change region 9. In the traffic situation illustrated in FIG. 1, the ego vehicle E should account for the third surrounding vehicle $S_3$ and the fourth surrounding vehicle $S_4$ in the current lane 3.

The lane-change region 9 is defined by the environment where the ego vehicle E does not have right-of-way i.e., the objects, e.g., vehicles, pedestrians, and road barriers the ego vehicle E takes into account when performing the lateral motion of the lane change maneuver. The ego vehicle E should maintain a minimum safe distance to these objects, when it laterally moves from the current lane 3 into the target lane 5. In the traffic situation illustrated in FIG. 1, the ego vehicle E should account for all four of the surrounding vehicles $S_1$, $S_2$, $S_3$, $S_4$ in the current lane 3 and the target lane 5.

The inter-vehicle traffic gap region 11 is defined by the objects, e.g., vehicles, pedestrians, and road barriers which the ego vehicle E should account for after leaving the lane-change region 9. In the traffic situation illustrated in FIG. 1, the ego vehicle E should account for the first surrounding vehicle $S_1$ and the second surrounding vehicle $S_2$ in the target lane 5.

The ego vehicle E is provided with a system 200 for evaluating a lane change maneuver, which system 200 is further described below in conjunction with FIG. 2. The system 200 may form part of an automated lane change system. The ego vehicle E may further be provided with at least one additional system, which is adapted to determine a position on the road 1 of the ego vehicle E and its velocity, as commonly known in the art. Other systems may be adapted to in a known manner determine positions and velocities $v_1$, $v_2$, $v_3$, $v_4$ of the surrounding vehicles $S_1$, $S_2$, $S_3$, $S_4$ in relation to the ego vehicle E.

In order to plan a lane change maneuver, the system 200 is adapted to select an inter-vehicle traffic gap in the target lane 5, and at which time instance the ego vehicle E should laterally move into the selected inter-vehicle traffic gap. By considering a lane change maneuver as primarily a longitudinal motion planning problem, the approach for inter-vehicle traffic gap and initiation time selection as described herein determines whether there exists a longitudinal trajectory which allows the ego vehicle E to safely position itself in an inter-vehicle traffic gap in the target lane 5. The approach should thus determine whether a certain inter-vehicle traffic gap is feasible and at which time instance the lane change maneuver should be initiated. As such, the selection approach is adapted to crudely evaluate which inter-vehicle traffic gap that is most appropriate, e.g., in terms of the control signals, i.e., longitudinal deceleration/acceleration, which are required in order to reach the inter-vehicle traffic gap, and at which time instance to initialize the laterally movement into the selected inter-vehicle traffic gap.

To simply estimate whether a certain inter-vehicle traffic gap is feasible, the feasible set of the ego vehicle E can crudely be approximated by acceleration profiles, e.g., constant acceleration profiles, which may range over a discrete interval from the maximum to the minimum feasible acceleration which satisfies the physical and design limitations of the ego vehicle E. The limitations may come from the ego vehicle itself, e.g., its technical performance, but may also be set by external factors, such as road conditions or weather conditions, e.g., a slippery road or a heavy rainfall.

As such, for each possible inter-vehicle traffic gap and discrete time instance to initialize the lane change maneuver, it can easily be determined if a certain acceleration profile allows the ego vehicle E to enter the lane-change region 9 and remain in that region for a minimum time $t_{min}$, and thereafter safely be positioned in the inter-vehicle traffic gap region 11 over the prediction horizon. The minimum time $t_{min}$ is the minimum time it takes for the ego vehicle E to laterally traverse the lane-change region 9. To allow for smooth and comfortable lane change maneuvers, the most appropriate inter-vehicle traffic gap and time instance for when to initiate the lane change maneuver can be selected as the inter-vehicle traffic gap with corresponding time instance which is feasible utilizing the lowest magnitude control signals.

To avoid collision conflicts with objects in the surrounding traffic environment, the ego vehicle should maintain a minimum safe distance $d_s$ to all surrounding objects $S_1$, $S_2$, $S_3$, $S_4$ as described by e.g., $$d_s(v_i) = \max(\in, \tau v_i) \qquad (4)$$

where $v_i$ is the velocity of a surrounding object $S_i$ and $\in$ and $\tau$ respectively denote the minimum distance and time gap which the ego vehicle E should maintain to the surrounding object $S_i$.

To further account for uncertainty in the surrounding traffic environment and allow the ego vehicle E the possibility to abort a lane change maneuver in order to avoid collision conflicts, additional safety aspects can be considered. When planning a lane change maneuver, a safety critical event which should be taken into account is the possibility of any relevant preceding vehicle unexpectedly performing a substantial brake maneuver. To account for this possibility, the ego vehicle E should not perform a lane change maneuver for which it does not have the ability to avoid a collision if such an event occurs. Thus, when selecting the inter-vehicle traffic gap and time instance for when to initiate the maneuver, in addition to a certain acceleration profile allowing the ego vehicle E to enter the lane-change region 9 and remain in that region for the minimum time $t_{min}$, and thereafter safely be positioned in the inter-vehicle traffic gap region 11 over the prediction horizon, it should also be possible for the ego vehicle E to apply a deceleration profile which allows it to not be closer than the minimum distance E to the surrounding vehicle at the next time instance. As such, when determining the most appropriate inter-vehicle traffic gap and time instance for performing the lane change maneuver, the possibility of a relevant preceding vehicle performing a substantial brake maneuver is accounted for, and thereby it should be possible for the ego vehicle E to avoid a collision in such a situation.

To further account for the possibility of a relevant preceding vehicle $S_i$, illustrated as the first surrounding vehicle $S_1$ in FIG. 1, unexpectedly performing a substantial brake maneuver, whilst is in the lane-change region 9, the velocity $v_x(v_i)$ of the ego vehicle E in the longitudinal direction x is constrained to $$v_x(v_i) = \min(v_{x_{max}}, \sqrt{v_i^2 - 2a_{x_{min}} d_b})  \quad (5)$$

where $v_{x_{max}}$ denotes the maximum allowed velocity of the ego vehicle E, $a_{x_{min}}$ denotes the minimum acceleration of the ego vehicle E, i.e., maximum deceleration, and $d_b$ denotes a possible braking distance defined as e.g., $$d_b(v_i) = \tau v_i - E \quad (6).$$

Figure 2:
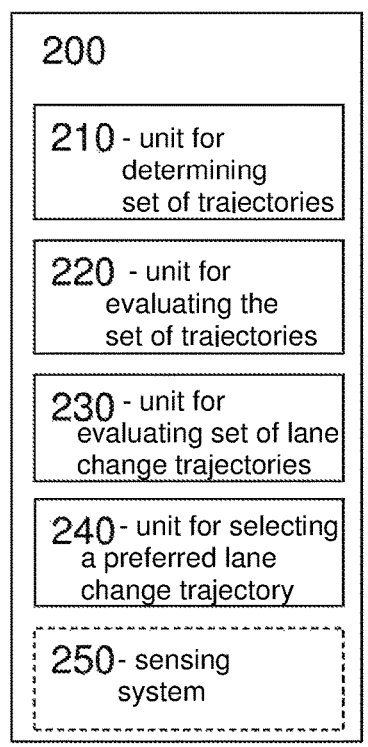
FIG. 2 illustrates an exemplifying system for evaluating inter-vehicle traffic gaps and time instances to perform a lane change maneuver according to the disclosure.

The system 200 for evaluating inter-vehicle traffic gaps and time instances to perform a lane change maneuver, which is illustrated in FIG. 2, comprises a number of units:
- a unit 210 for determining a set of trajectories which respectively constitutes an approximation of feasible motion of the ego vehicle E,
- a unit 220 for evaluating the set of trajectories on available inter-vehicle traffic gaps and time instances to perform the lane change maneuver over a prediction horizon, to select a subset of feasible inter-vehicle traffic gaps and time instances to perform the lane change maneuver and to establish a corresponding set of lane change trajectories,
- a unit 230 for evaluating the set of lane change trajectories on the set of feasible inter-vehicle traffic gaps and time instances from a safety critical perspective, and
- a unit 240 for selecting a preferred lane change trajectory, with corresponding inter-vehicle traffic gap and time instance, to perform the lane change maneuver.

The system 200 may further comprise a sensing system 250, e.g., comprising camera and/or radar monitoring, for determining relative positions and/or velocities of at least one of the surrounding objects $S_1$, $S_2$, $S_3$, $S_4$, preferably for all, or substantially all, surrounding objects $S_1$, $S_2$, $S_3$, $S_4$. Additionally, or alternatively, the surrounding objects $S_1$, $S_2$, $S_3$, $S_4$ may transmit information about their positions and/or velocities and the ego vehicle E may receive this information directly or via an information database.

According to the disclosure, there may further be provided an automated lane change system comprising the system for evaluating inter-vehicle traffic gaps and time instances to perform a lane change maneuver as disclosed herein.

In addition, there may be an advanced driver assistance system comprising the automated lane change system.

Moreover, there may be provided a vehicle comprising the system 200 for evaluating inter-vehicle traffic gaps and time instances to perform a lane change maneuver as described herein, the lane change system and/or the advanced driver assistance system.

Those skilled in the art will appreciate that the system 200, determining unit 210, evaluating units 220, 230, selecting unit 240, sensing system 250, and/or any other unit, system, device or module described herein may comprise, in whole or in part, a combination of analog and digital circuits and/or one or more processors configured with appropriate software and/or firmware, e.g. stored in a memory, that when executed by the one or more processors perform the functions and/or operations described herein. One or more of such processors, as well as the other digital hardware, may be included in a single ASIC (Application-Specific Integrated Circuitry), or several processors and various digital hardware may be distributed among several separate components, whether individually packaged or assembled into a SoC (System-on-a-Chip). Furthermore, the system 200, determining unit 210, evaluating units 220, 230, selecting unit 240, sensing system 250, and/or any other unit, system, device or module described herein may for instance be implemented in one or several arbitrary nodes comprised in the host vehicle E. In that regard, such a node may comprise an electronic control unit (ECU) or any suitable electronic device, which may be a main or central node.

Figure 3:
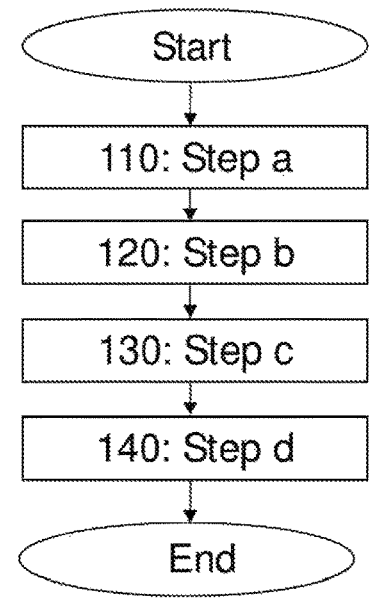
FIG. 3 illustrates an exemplifying method for evaluating inter-vehicle traffic gaps and time instances to perform a lane change maneuver according to the disclosure.

The method as disclosed and described in more detail above is illustrated in FIG. 3.

The method comprises four steps.

110: Step a comprises determining a set of trajectories which respectively constitutes an approximation of feasible motion of the ego vehicle E, 120: Step b comprises evaluating the set of trajectories on available inter-vehicle traffic gaps and time instances to perform the lane change maneuver over a prediction horizon, to select a subset of feasible inter-vehicle traffic gaps and time instances to perform the lane change maneuver and to establish a corresponding set of lane change trajectories, 130: Step c comprises evaluating the set of lane change trajectories on the set of feasible inter-vehicle traffic gaps and time instances from a safety critical perspective, and 140: Step d comprises selecting a preferred lane change trajectory, with corresponding inter-vehicle traffic gap and time instance, to perform the lane change maneuver.

Further modifications of the disclosure within the scope of the appended claims are feasible. As such, the present disclosure should not be considered as limited by the embodiments and figures described herein. Rather, the full scope of the disclosure should be determined by the appended claims, with reference to the description and drawings.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments.

What is claimed is:

1. A method for evaluating inter-vehicle traffic gaps and time instances to perform a lane change maneuver, the method to be performed by a system on-board an ego vehicle, the ego vehicle travelling in a current lane of a road, the road also comprising a target lane adjacent to the current lane, the lane change maneuver including the ego vehicle changing from the current lane to an inter-vehicle traffic gap in the target lane, the method comprising:
   (a) determining a set of trajectories which respectively constitutes an approximation of feasible motion of the ego vehicle assuming a number of acceleration profiles of the ego vehicle;
   (b) evaluating the set of trajectories on available inter-vehicle traffic gaps and time instances to perform the lane change maneuver over a prediction horizon to select a subset of feasible inter-vehicle traffic gaps and time instances to perform the lane change maneuver and to establish a corresponding set of lane change trajectories;
   (c) evaluating the set of lane change trajectories on the subset of feasible inter-vehicle traffic gaps and time instances from a safety critical perspective taking a safety critical event into account comprising a surrounding vehicle braking or performing a lane change maneuver; and
   (d) selecting a lane change trajectory from the evaluated set of lane change trajectories, with corresponding inter-vehicle traffic gap and time instance, to perform the lane change maneuver.

2. The method according to claim 1 wherein the number of acceleration profiles are within a range going from a minimum acceleration of the ego vehicle to a maximum acceleration of the ego vehicle.

3. The method according to claim 1 wherein (b) comprises determining if a trajectory determined in (a) allows the ego vehicle to enter a corresponding lane-change region of a certain inter-vehicle traffic gap and remain in the lane-change region for a minimum time, and thereafter safely be positioned in a corresponding inter-vehicle traffic gap region in the target lane over the prediction horizon.

4. The method according to claim 1 wherein (b) comprises the ego vehicle maintaining a minimum safe distance to at least one surrounding object.

5. The method according to claim 1 wherein the safety critical event comprises a preceding vehicle making a brake maneuver.

6. The method according to claim 3 wherein a velocity of the ego vehicle is constrained in the lane-change region.

7. The method according to claim 1 wherein (d) is performed by selecting a trajectory for which one or more required control signals for the ego vehicle has the smallest magnitude.

8. A system for evaluating inter-vehicle traffic gaps and time instances to perform a lane change maneuver, the lane change maneuver to be performed when an ego vehicle travels in a current lane of a road, the road also comprising a target lane adjacent to the current lane, the lane change maneuver including the ego vehicle changing from the current lane to an inter-vehicle traffic gap in the target lane, the system comprising:
   a determining unit for determining a set of trajectories which respectively constitutes an approximation of feasible motion of the ego vehicle assuming a number of acceleration profiles of the ego vehicle;
   a first evaluating unit for evaluating the set of trajectories on available inter-vehicle traffic gaps and time instances to perform the lane change maneuver over a prediction horizon to select a subset of feasible inter-vehicle traffic gaps and time instances to perform the lane change maneuver and to establish a corresponding set of lane change trajectories;
   a second evaluating unit for evaluating the set of lane change trajectories on the subset of feasible inter-vehicle traffic gaps and time instances from a safety critical perspective taking a safety critical event into account comprising a surrounding vehicle braking or performing a lane change maneuver; and
   a selecting unit for selecting a lane change trajectory from the evaluated set of lane change trajectories, with corresponding inter-vehicle traffic gap and time instance, to perform the lane change maneuver.

9. The system according to claim 8 further comprising a sensing system for determining relative positions or velocities of at least one surrounding object.

10. An automated lane change system comprising the system according to claim 8.

11. An advanced driver assistance system comprising the automated lane change system according to claim 10.

12. A vehicle comprising the system according to claim 8.

13. A vehicle comprising the automated lane change system according to claim 10.

14. A vehicle comprising the advanced driver assistance system according to claim 11.

15. A method for evaluating inter-vehicle traffic gaps and time instances for use by a host vehicle to perform a lane change maneuver from a current lane of a road to an inter-vehicle traffic gap in a target lane adjacent the current lane, the method comprising:
   (a) determining a set of trajectories which respectively represent potential motion of the host vehicle assuming a number of acceleration profiles of the host vehicle;
   (b) evaluating the set of trajectories on available inter-vehicle traffic gaps and time instances to perform the lane change maneuver over a prediction horizon to thereby select a set of inter-vehicle traffic gaps and time instances and to establish a corresponding set of lane change trajectories;
   (c) evaluating the set of lane change trajectories on the set of inter-vehicle traffic gaps and time instances based on a safety critical event comprising a surrounding vehicle braking or performing a lane change maneuver; and
   (d) selecting a lane change trajectory from the evaluated set of lane change trajectories, with corresponding inter-vehicle traffic gap and time instance, to perform the lane change maneuver.

16. The method according to claim 15 further comprising the host vehicle performing the selected lane change maneuver.

17. The method according to claim 15 wherein (c) comprises applying a deceleration profile which allows the host vehicle to maintain at least a minimum distance to a surrounding vehicle to thereby avoid a collision with the surrounding vehicle.

18. The method according to claim 15 wherein (b) comprises determining if a trajectory determined in (a) allows the host vehicle to enter a corresponding lane-change region of a certain inter-vehicle traffic gap and remain in the lane-change region for a minimum time, and thereafter safely be positioned in a corresponding inter-vehicle traffic gap region in the target lane over the prediction horizon.

19. The method according to claim 15 wherein the safety critical event comprises the surrounding vehicle braking, and wherein the surrounding vehicle is a preceding vehicle.

20. The method according to claim 15 wherein the safety critical event comprises the surrounding vehicle performing a lane change maneuver.

\* \* \* \* \*